United States Patent
Xue et al.

(10) Patent No.: US 12,006,255 B2
(45) Date of Patent: Jun. 11, 2024

(54) LITHIUM CONTAINING ALUMINOSILICATE GLASS WITH LOW EXPANSION AFTER CHEMICAL TOUGHENING

(71) Applicant: SCHOTT Glass Technologies (Suzhou) Co. Ltd., Jiangsu (CN)

(72) Inventors: Junming Xue, Shanghai (CN); Feng He, Jiangsu (CN); Jose Zimmer, Eppstein (DE); Ning Da, Jiangsu (CN)

(73) Assignee: SCHOTT Glass Technologies (Suzhou) Co. Ltd., Jiangsu (CN)

( * ) Notice: Subject to any disclaimer, the term of this patent is extended or adjusted under 35 U.S.C. 154(b) by 21 days.

(21) Appl. No.: 16/552,326

(22) Filed: Aug. 27, 2019

(65) Prior Publication Data
US 2019/0382302 A1 Dec. 19, 2019

Related U.S. Application Data

(63) Continuation of application No. PCT/CN2017/075041, filed on Feb. 27, 2017.

(51) Int. Cl.
*C03C 3/083* (2006.01)
*C03C 3/078* (2006.01)
(Continued)

(52) U.S. Cl.
CPC ............... *C03C 3/083* (2013.01); *C03C 3/078* (2013.01); *C03C 3/089* (2013.01); *C03C 3/097* (2013.01); *C03C 2203/50* (2013.01)

(58) Field of Classification Search
CPC ......... C03C 3/083; C03C 3/078; C03C 3/089; C03C 3/097; C03C 2203/50; C03C 3/091; C03C 3/093; C03C 3/085
See application file for complete search history.

(56) References Cited

U.S. PATENT DOCUMENTS

| 8,187,987 | B2 | 5/2012 | Amin et al. |
| 9,096,460 | B2 | 8/2015 | Brix et al. |

(Continued)

FOREIGN PATENT DOCUMENTS

| CN | 102336521 A | 2/2012 |
| CN | 102690059 A | 9/2012 |

(Continued)

OTHER PUBLICATIONS

Merriam-Webster definition of "dense" (Year: 2023).*
(Continued)

*Primary Examiner* — Bryan D. Ripa
*Assistant Examiner* — Cameron K Miller
(74) *Attorney, Agent, or Firm* — Taylor IP, P.C.

(57) ABSTRACT

A chemically toughenable or toughened glass has, before chemical toughening, a thickness t of at most 1100 μm. The glass comprises the following components: 45-75 mol-% $SiO_2$; 10-25 mol-% $Al_2O_3$; >1-11 mol-% $Li_2O$; 0-15 mol-% $P_2O_5$; 0-8 mol-% $B_2O_3$; and 0-5 mol-% $TiO_2$. The average number of bridging oxygen per polyhedron (BO) calculated as $2*4-2*(c_{mol}(O)/(c_{mol}(Si)+c_{mol}(Al)+c_{mol}(B)+c_{mol}(P)+c_{mol}(Ti)))$ is higher than 3.55. Upon chemical toughening, the linear dimension variation in the unit of percentage ($V_1$) is so low that the overall geometry variation (OGV) calculated as $(DoL/t)/V_1$ is higher than 0.8. DoL is the total depth of all ion-exchange layers on one side of the glass and DoL is more than 1 μm, when the glass is chemically toughened with $NaNO_3$ only, $KNO_3$ only or with both $KNO_3$ and $NaNO_3$.

23 Claims, 1 Drawing Sheet

(51) Int. Cl.
  *C03C 3/089* (2006.01)
  *C03C 3/097* (2006.01)

(56) References Cited

U.S. PATENT DOCUMENTS

| | | | |
|---|---|---|---|
| 10,071,933 B2 | 9/2018 | Wang et al. | |
| 2009/0220761 A1* | 9/2009 | Dejneka | C03C 21/002 |
| | | | 501/67 |
| 2016/0102011 A1* | 4/2016 | Hu | C03C 3/091 |
| | | | 428/155 |
| 2017/0174556 A1* | 6/2017 | Miyabe | C03C 4/18 |
| 2017/0183259 A1 | 6/2017 | Da et al. | |
| 2019/0263713 A1* | 8/2019 | Murayama | C03C 3/085 |
| 2019/0362754 A1* | 11/2019 | Sato | C23C 14/16 |

FOREIGN PATENT DOCUMENTS

| | | | |
|---|---|---|---|
| CN | 104230165 A | 12/2014 | |
| EP | 2 189 424 A2 | 5/2010 | |
| JP | 2000-7372 A | 1/2000 | |
| JP | 2012-36092 A | 2/2012 | |
| WO | 2012/126394 A1 | 9/2012 | |
| WO | WO-2012126394 A1 * | 9/2012 | C03C 10/0036 |
| WO | 2016/115685 A1 | 7/2016 | |
| WO | 2016/136539 A1 | 9/2016 | |

OTHER PUBLICATIONS

International Search Report dated Nov. 22, 2017 for International Application No. PCT/CN2017/075041 (5 pages).
Japanese Office Action dated Dec. 22, 2020 for Japanese Patent Application No. 2019-541455 (5 pages).
English translation of Japanese Office Action dated Dec. 22, 2020 for Japanese Patent Application No. 2019-541455 (6 pages).
Korean Office Action dated Apr. 22, 2021 for Korean Application No. 10-2019-7028543 (7 pages).
English translation of Korean Office Action dated Apr. 22, 2021 for Korean Application No. 10-2019-7028543 (6 pages).
Chinese Office Action dated May 6, 2021 for Chinese Application No. 201780087528.9 (12 pages).
English translation of Japanese Office Action dated Aug. 16, 2021 for Japanese Application No. 2019-541455 (8 pages).
Introduction to Ceramics, "Thermal Properties", W. D. Kingery, et al., Wiley Series on The Science and Technology of Materials, Chapter 12, pp. 583-645 (32 pages).
Chinese Office Action dated Dec. 3, 2021 for Chinese Application No. 201780087528.9 (15 pages).
English translation of Chinese Office Action dated Dec. 3, 2021 for Chinese Application No. 201780087528.9 (15 pages).
Japanese Office Action dated May 9, 2022 for Japanese Patent Application No. 2019-541455 (5 pages).
English translation of Japanese Office Action dated May 9, 2022 for Japanese Patent Application No. 2019-541455 (7 pages).
Chinese Office Action dated May 17, 2022 for Chinese Patent Application No. 201780087528.9 (9 pages).
English translation of Chinese Office Action dated May 17, 2022 for Chinese Patent Application No. 201780087528.9 (12 pages).
Chinese Second Office Action dated Jun. 7, 2022 for Chinese Patent Application No. 201710217142.7 (9 pages).
English Translation of Chinese Second Office Action dated Jun. 7, 2022 for Chinese Patent Application No. 201710217142.7 (9 pages).

* cited by examiner

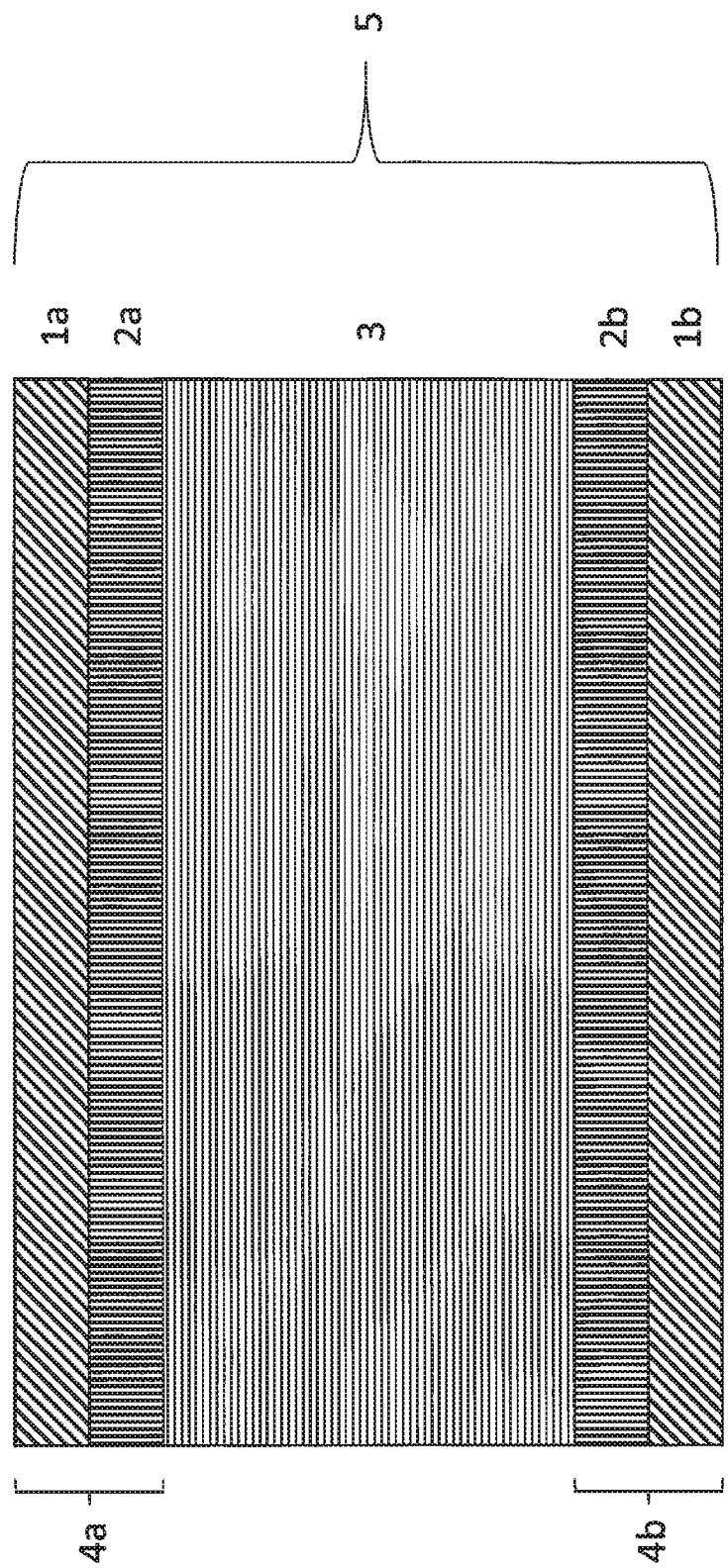

LITHIUM CONTAINING ALUMINOSILICATE GLASS WITH LOW EXPANSION AFTER CHEMICAL TOUGHENING

CROSS REFERENCE TO RELATED APPLICATIONS

This is a continuation of PCT application No. PCT/CN2017/075041, entitled "LITHIUM CONTAINING ALUMINOSILICATE GLASS WITH LOW EXPANSION AFTER CHEMICAL TOUGHENING", filed Feb. 27, 2017, which is incorporated herein by reference.

BACKGROUND OF THE INVENTION

1. Field of the Invention

The present disclosure relates to a thin chemically toughenable or toughened lithium containing aluminosilicate glass with low expansion after chemical toughening. The present disclosure also relates to a method for producing the glass as well as to uses of the glass. The glass may be used in applications in the field of finger print sensors (FPS) and/or display cover, in particular in applications in the field of high precision equipment, electronic devices, or home appliance.

2. Description of the Related Art

During glass manufacturing, a glass product is formed by cooling from melted liquid state at high temperature to solid state at room temperature. In the process, the atoms will be rapidly frozen in a disordered way. When the manufactured glass experiences another post heat treatment, the atoms frozen during the manufacturing cooling process will get a chance to be relaxed to a dens-er position. In this way, a geometry compaction will occur.

This phenomenon is valid also for thin glass sheet made by drawing or over flow process. When the glass sheet is reheated during a post processing, for instance, fine annealing or low-temperature polycrystalline silicon (LTPS) treatment, the glass dimension will be compacted compared with its original geometry.

European Patent Application EP 2 189 424 A2 has disclosed a process for producing a glass which has a low compact ratio used for TFT application, especially for LTPS. The mentioned glass has an annealing point of ≥765° C. and CTE≤4.2 ppm/K. It is an alkaline free glass, in contrast to the glass of the present disclosure that relates to lithium containing aluminosilicate glass.

Aluminosilicate (AS), lithium aluminosilicate (LAS) and soda-lime glasses are widely used for applications such as covers for finger print sensor (FPS), protection cover, and display cover. In these applications, the glasses usually will be chemically toughened to achieve a high mechanical strength, as determined by 3-point bending (3PB), ball drop, anti-scratch and others.

Notably, thin glass cannot be effectively produced via grinding and polishing with very high surface qualities, e.g. Ra roughness smaller than 5 nm. Therefore, glasses having low thickness and low surface roughness have to be produced via flat glass processes such as down draw or overflow fusion processes or special float or redraw.

However, as mentioned above, geometry change will occur when a glass experiences a post heat treatment. Importantly, the chemical toughening process is such post heat treatment. On the one hand, chemical toughening generally involves elevated temperatures, for example more than 350° C. or more than 380° C. or even more than 400° C. for time spans from minutes to hours. Therefore, the chemical toughening process is connected to forces that direct the glass geometry towards compaction as compared to the original glass because the atoms frozen during the manufacturing cooling process will get a chance to be relaxed to a denser position. On the other hand, chemical toughening is directed to replacing smaller ions (for example $Li^+$, $Na^+$) at the glass surface with bigger ions (for example $K^+$) by ion-exchange which results in geometry expansion. Thus, during chemical toughening two opposing effects occur, one that is directed to compaction of the glass (heat treatment) and one that is directed to expansion of the glass (ion-exchange). In the end, the net overall geometry change depends on the extent of the contributions from both aspects.

Currently, thin glass with low thickness made by thin glass processes has a large expansion ratio after chemical toughening. The expansion ratio is determined by dividing the difference of the length of the sample after and before the chemical toughening through the original length before chemical toughening. Thus the expansion ratio is calculated according to the following formula: expansion ratio= (length$_{after\ toughening}$−length$_{before\ toughening}$)/length$_{before\ toughening}$. The length of the sample is usually measured visually by a projection measurement system, in particular a 2.5D video measurement system. Notably, the expansion caused by chemical toughening process will become larger when the glass is thinner. Furthermore, the expansion caused by chemical toughening also depends on the thermal history of the glass. If high cooling rates have been applied during manufacturing, the expansion during chemical toughening becomes larger.

The expansion causes difficulties for the industry processors with regard to design and control of product dimension with very high precision. Therefore, it is extremely important to provide a glass with low geometry variations in order to meet the requirement of today's high precision devices.

SUMMARY OF THE INVENTION

Exemplary embodiments disclosed herein provide a thin glass that is chemically toughenable or toughened and that has low expansion after chemical toughening.

In some exemplary embodiments provided according to the present disclosure, a chemically toughenable or toughened glass has, before chemical toughening, a thickness t of at most 1100 µm. The glass comprises the following components: 45-75 mol-% $SiO_2$; 10-25 mol-% $Al_2O_3$; >1-11 mol-% $Li_2O$; 0-15 mol-% $P_2O_5$; 0-8 mol-% $B_2O_3$; and 0-5 mol-% $TiO_2$. The average number of bridging oxygen per polyhedron (BO) calculated as $2*4-2*(c_{mol}(O)/(c_{mol}(Si)+c_{mol}(Al)+c_{mol}(B)+c_{mol}(P)+c_{mol}(Ti)))$ is higher than 3.55. Upon chemical toughening, the linear dimension variation in the unit of percentage ($V_l$) is so low that the Overall Geometry Variation (OGV) calculated as $(DoL/t)/V_l$ is higher than 0.8. DoL is the total depth of all ion-exchange layers on one side of the glass and DoL is more than 1 µm, when the glass is chemically toughened with $NaNO_3$ only, $KNO_3$ only or with both $KNO_3$ and $NaNO_3$.

In some exemplary embodiments, a method for producing the glass is provided. The method includes the steps of providing a composition, melting the composition, producing a glass from the melted composition, and chemically toughening the glass. The glass has, before chemical toughening, a thickness t of at most 1100 µm. The glass comprises the following components in mol-%: $SiO_2$ 45-75; $Al_2O_3$ 10-25; $Li_2O$ >1-11; $P_2O_5$ 0-15; $B_2O_3$ 0-8; and $TiO_2$ 0-5. An average number of bridging oxygen per polyhedron (BO) calculated as $2*4-2*(c_{mol}(O)/(c_{mol}(Si)+c_{mol}(Al)+c_{mol}(B)+c_{mol}(P)+c_{mol}(Ti)))$ is higher than 3.55 and upon chemical toughening a linear dimension variation in the unit of percentage ($V_1$) is so low that an overall geometry variation (OGV) calculated as $(DoL/t)/V_1$ is higher than 0.8. DoL is a total depth of all ion-exchange layers on one side of the glass and DoL is more than 1 μm, when the glass is chemically toughened with $NaNO_3$ only, $KNO_3$ only, or with both $KNO_3$ and $NaNO_3$.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawing, wherein:

FIG. 1 illustrates a cross section of a chemically toughened glass provided according to the present disclosure.

The exemplification set out herein illustrates one embodiment of the invention and such exemplification is not to be construed as limiting the scope of the invention in any manner.

DETAILED DESCRIPTION OF THE INVENTION

Referring now to the sole drawing FIG. 1, an exemplary embodiment of a chemically toughened glass 5 provided according to the present disclosure is illustrated. The glass has two ion exchange regions 4a, 4b that are separated by a central bulk glass 3 that has not been ion exchanged. The thickness t of glass 5 is the sum of the thickness the bulk glass 3, the thickness (depth of layer, DoL) of ion exchange region 4a and the thickness (depth of layer, DoL) of ion exchange region 4b. Each ion exchange region consists of an outer ion exchange layer 1a, 1b and an inner ion exchange layer 2a, 2b.

Typically, the three-dimensional spatial extent of a glass sample is described by indicating the length, the width and the thickness of the sample. Typically, the length is greater than the width and the width is greater than the thickness of the sample. According to the present disclosure, the expansion after chemical toughening is described by the expansion of the length of the sample.

For example, if the sample has a length of 100 cm before chemical toughening and a length of 100.1 cm after chemical toughening, the expansion after chemical toughening calculated as (100.1 cm−100 cm)/100 cm equals 0.1 cm/100 cm=0.1%. More generally, expansion after chemical toughening is calculated as $(length_{after\ toughening} - length_{before\ toughening})/length_{before\ toughening}$. In some embodiments, the length of the sample is measured visually by a projection measurement system, such as by an automatic image measuring instrument, in particular by a 2.5D video measurement system.

The terms "expansion ratio", "expansion after chemical toughening", "relative geometry expansion" and "linear dimension variation" are used interchangeably herein.

According to the present disclosure, low expansion means that the length of the glass has expanded only to a minor extent after chemical toughening as compared to the dimensions of the glass prior to chemical toughening. In some embodiments, expansion after chemical toughening is less than 0.4%, such as less than 0.3%, less than 0.2%, less than 0.15%, less than 0.1%, or less than 0.05%.

Chemically toughenable or toughened glass provided according to the present disclosure has, before chemical toughening, a thickness t of at most 1100 μm and comprises the following components in mol-%:

$SiO_2$ 45-75
$Al_2O_3$ 10-25
$Li_2O$ >1-11
$P_2O_5$ 0-15
$B_2O_3$ 0-8
$TiO_2$ 0-5;

the average number of bridging oxygen per polyhedron (BO) calculated as $2*4-2*(c_{mol}(O)/(c_{mol}(Si)+c_{mol}(Al)+c_{mol}(B)+c_{mol}(P)+c_{mol}(Ti)))$ is higher than 3.55. Upon chemical toughening, the linear dimension variation in the unit of percentage ($V_1$) is so low that the Overall Geometry Variation (OGV) calculated as $(DoL/t)/V_1$ is higher than 0.8. DoL is the total depth of all ion-exchange layers on one side of the glass and DoL is more than 1 μm, when the glass is chemically toughened with $NaNO_3$ only, with $KNO_3$ only or with both $KNO_3$ and $NaNO_3$.

Chemical toughening with both $KNO_3$ and $NaNO_3$ may be done by using at least one mixture of $KNO_3$ and $NaNO_3$ or by performing separate toughening steps with pure $NaNO_3$ and pure $KNO_3$. Also in embodiments in which the glass is chemically toughened with mixtures of $KNO_3$ and $NaNO_3$, two distinct consecutive toughening steps may be performed. In some embodiments, the proportion of $KNO_3$ in the mixture used for the second toughening step is higher than the proportion of $KNO_3$ in the mixture used for the first toughening step.

According to the present disclosure, the linear dimension variation $V_1$ is calculated by the formula $(length_{after\ toughening} - length_{before\ toughening})/length_{before\ toughening}$. In some embodiments, the length of the sample is measured visually by a projection measurement system, such as by an automatic image measuring instrument, in particular by a 2.5D video measurement system. It should be noted that $V_1$ is always used in the unit of percentage according to the present disclosure. For example, if $V_1$ is 0.1%, the value of $V_1$ that is used in the above-indicated formula is 0.1.

According to the present disclosure, the term "DoL" indicates the total depth of the ion exchange layer. In embodiments, in which the glass of the invention comprises an outer ion exchange layer and an inner ion exchange layer, the term "DoL" indicates total depth of the both layers. For example, if a glass comprises an outer ion exchange layer of 10 μm depth and an inner ion exchange layer of 20 μm depth, the DoL of such a glass indicates the sum of both depths and is thus 30 μm. The depths may be measured with a surface stress meter, in particular with a FSM 6000 surface stress meter produced by Orihara.

The present disclosure provides exemplary embodiments in which the glass comprises ion exchange layers on more than one side, in particular on two opposite sides, as exemplarily depicted in FIG. 1. However, the term "DoL" does not refer to the sum of depths of ion exchange layers on different sides of the glass. Rather, in such embodiments the term "DoL" refers to the total depth of layer (for example the sum of the depths of outer and inner ion exchange layer) on one side of the glass, in other words to the thickness of the ion exchange region being the sum of the thickness all ion exchange layers on one side of the glass. For example, in the exemplary embodiment of FIG. 1 the term "DoL" indicates the total depth of layers 1a and 2a or the total depth of layers 1b and 2b. In some embodiments, the total depths of inner and outer ion exchange layers on different sides of the glass are identical. For example referring to FIG. 1, the total depth of layers 1a and 2a may be identical to the total depth of layers 1b and 2b. According to the present description the term "identical" means that the total depth of inner and outer ion exchange layer on one side of the glass corresponds to the total depth of inner and outer ion exchange layer on the other side of glass ±5%.

According to the present disclosure, thin glass with low geometry change upon chemical toughening is provided. This is achieved by a two-fold measure. On the one hand, the glass composition is chosen such that a dense glass network is generated due to the presence of a large number of bridging oxygens per polyhedron. On the other, the glass is produced in a way that the thermal history of the glass is supporting the low geometry change. In particular, the cooling rate during production is chosen accordingly in order to further reduce expansion upon chemical toughening.

In general, the final net geometry change of a thin glass article with certain composition after toughening is mainly determined by three factors: namely Young's modulus, compaction due to high toughening temperature, and the ratio between DoL (depth of layer) and glass thickness.

Young's modulus reflects the material expansion when certain force is applied to the material. The larger the Young's modulus, the more difficult the geometry variation will be. Therefore, the glass should have a reasonably high Young's modulus in order to resist geometry changes and to keep expansion after chemical toughening low. In some embodiments, the glass of the present disclosure has a Young's modulus of at least 60 GPa, such as at least 65 GPa, at least 70 GPa, at least 75 GPa, or at least 80 GPa. However, the Young's modulus should also not be extraordinarily high so that a certain degree of elasticity is maintained. In some embodiments, the glass of the present disclosure has a Young's modulus of at most 120 GPa, such as at most 115 GPa, at most 110 GPa, at most 105 GPa, or at most 100 GPa. The Young's modulus can be measured with standard methods known in the art. The Young's modulus may be measured according to DIN 13316:1980-09.

The extent of contracting forces that occur during chemical toughening due to the treatment at elevated temperatures depends on the thermal history of the glass and its composition. The faster the glass has been cooled during production, the less dense the glass is and thus the higher the contracting forces are upon re-heating, for example during chemical toughening. However, on the other hand chemical toughening contributes to expansion of the glass because smaller ions ($Li^+$, $Na^+$) at the glass surface are replaced with bigger ions ($K^+$) by ion-exchange. It has been found that the expansion effects are larger than the compaction effects. In other words, chemical toughening causes glass expansion. The higher the cooling rate of the glass during production was, the higher is the expansion of the glass upon chemical toughening. Thus, in order to limit glass expansion upon chemical toughening, the cooling rate during production should be restricted. However, the cooling rate should also not be very low because otherwise a very compact glass is obtained and chemical toughening by ion-exchange becomes very difficult. Hence, the cooling rate needs to be optimized in order to obtain a glass that is excellently chemically toughenable and nevertheless only moderately expands upon chemical toughening.

Relevant with regard to the above-indicated properties of the glass in particular the cooling rate in the temperature region around the annealing point of the glass, in particular the temperature region corresponding to a glass viscosity of $10^{10}$ dPas to $10^{15}$ dPas. In some embodiments, the average cooling rate in the temperature region corresponding to a glass viscosity of $10^{10}$ dPas to $10^{15}$ dPas is higher than 5° C./s, such as higher than 10° C./s, higher than 30° C./s, higher than 50° C./s, or higher than 100° C./s. The average cooling rate in the temperature region corresponding to a glass viscosity of $10^{10}$ dPas to $10^{15}$ dPas may be, for example, lower than 200° C./s.

Furthermore, also the ratio between DoL (depth of layer) and glass thickness has an important influence on the extent of expansion of the glass upon chemical toughening. It has been found that the higher this ratio is, the higher the expansion after chemical toughening is.

To solve this issue of geometry variation caused by cooling rate and post heat treatment (i.e. chemical toughening), chemical toughenable glass with high Young's modulus and low compaction has been developed. It is surprisingly found that chemically toughenable glass with high BO (average number of bridging oxygen per polyhedron) combined with high Young's modulus is connected to smaller geometry changes. The BO value is a measure for the intrinsic resistance of the glass network to geometry variation. Thus, the higher BO is, the lower are the geometry changes upon chemical toughening.

According to the present disclosure, the product of BO and Young's modulus is termed "Geometry Variation After Chemical Toughening" (GVACT).

$$GVACT=BO*Young's\ modulus \quad \text{(Formula 1)}$$

It has been found that the higher GVACT of the glass is, the lower is the geometry expansion of the glass after chemical toughening.

The network structure of a glass can be characterized with four parameters X, Y, Z and R, defined as follows:

X=average number of non-bridging oxygen per polyhedron, i.e. NBO;

Y=average number of bridging oxygen per polyhedron, i.e. BO;

Z=total average number of oxygen per polyhedron; and

R=ratio of total number of oxygen to total number of network formers.

R can be deduced from the molar composition of the borosilicate glass. The four parameters X, Y, Z and R can be calculated as described below. R can be calculated according to Formula 2, in which the term $c_{mol}$ (X) indicates the molar content of component X in the glass.

$$R=c_{mol}(O)/(c_{mol}(Si)+c_{mol}(Al)+c_{mol}(B)+c_{mol}(P)+c_{mol}(Ti)) \quad \text{(Formula 2)}$$

In other words, R is determined as the molar content of oxygen in the glass divided by the molar content of the sum of all network formers in the glass, wherein the network formers are silicon, aluminum, boron, phosphorous and titanium according to the present disclosure.

Z is the total average number of oxygen per polyhedron. An oxygen may be either a non-bridging oxygen or a bridging oxygen. Bridging oxygens link two network formers together, whereas non-bridging oxygens are only bound to one network former and may thus form an ionic bond with a network modifier. According to the present disclosure, network modifiers are atoms that are neither network formers, nor oxygen. Exemplary network modifiers of the present disclosure are selected from the group consisting of Li, Na, K, Mg, Zn and Zr.

As an oxygen may be either a non-bridging oxygen or a bridging oxygen, the total average number of oxygen per polyhedron (Z) can be calculated as the sum of the average number of non-bridging oxygen per polyhedron (NBO or X) and the average number of bridging oxygen per polyhedron (BO or Y) according to Formula 3.

$$X+Y=Z \quad \text{(Formula 3)}$$

The correlation between X, Y and R is depicted in Formula 4.

$$X+Y/2=R. \quad \text{(Formula 4)}$$

For silicates, the total average number of oxygen per polyhedron is 5.

$$Z=4 \quad \text{(Formula 5)}$$

From the formulas above, it can be concluded that, $$Y=BO=2Z-2R=2*4-2*(c_{mol}(O)/(c_{mol}(Si)+c_{mol}(Al)+c_{mol}(B)+c_{mol}(P)+c_{mol}(Ti))) \quad \text{(Formula 6)}$$

As described above, it has been found that the higher GVACT of the glass is, the lower is the geometry expansion of the glass after chemical toughening. Thus, it is advantageous if GVACT is high. As GVACT is the product of BO and Young's modulus according to Formula 1, it is advantageous if BO and/or Young's modulus are high. As BO can be calculated as 2Z-2R according to Formula 6, it is understood that it is advantageous if R is small.

In some embodiments, BO is higher than 3.55, such as higher than 3.6, higher than 3.7, higher than 3.75, higher than 3.8, higher than 3.85, higher than 3.9, higher than 3.95, higher than 3.97, or higher than 3.99. However, BO should also not be extremely high. If BO is very high, the viscosity may be increased which may compromise the meltability. In some embodiments, BO is at most 4.00.

In some embodiments, GVACT of the glass is higher than 200 GPa, such as higher than 250 GPa, higher than 270 GPa, higher than 280 GPa, higher than 290 GPa, higher than 300 GPa, higher than 310 GPa, higher than 315 GPa, higher than 320 GPa, higher than 330 GPa, or higher than 340 GPa. However, GVACT should not be very high. If GVACT is very high, the viscosity may be increased which may compromise the meltability. In some embodiments, GVACT is less than 500 GPa, such as less than 480 GPa, less than 450 GPa, less than 400 GPa, less than 375 GPa, or less than 350 GPa.

It should be understood that GVACT is a parameter that describes the ability of the glass to withstand geometrical expansion induced by the chemical toughening process. GVACT is the product of BO and Young's modulus (Formula 1). BO can be regarded as a parameter reflecting the network structure of a glass resulting from the specific chemical compositions. It has surprisingly been found that the network structure indicated by the BO of the silicate glasses as described herein influences the densification of the network of the glass and thus influences the geometry variation of the glass before and after chemical toughening, as well as the toughened performance. In other words, the expansion variation of the glasses as described herein can be significantly improved by adjusting the BO content inside the glass. High BO reflects a highly connected network structure and thus also a comparably dense network. In summary, a high Y(=BO) value combined with high Young's modulus leads to a high GVACT and hence a low geometry variation after chemical toughening.

Moreover, BO also influences the viscosity and the down draw processability of the glass. High BO is connected to an increased viscosity of the glass melt. Furthermore, a high BO is connected to an increased difference between $T_4$ and $T_{OEG}$ and thus to an improved down draw processability as described below.

Another parameter that is important according to the present disclosure is termed Overall Geometry Variation (OGV) within the present specification. OGV can be calculated according to the following Formula 7.

$$OGV=(DoL/t)/V_1 \quad \text{(Formula 7)}$$

wherein DoL is depth of layer, t is the thickness of the glass before chemical toughening and $V_1$ is the linear dimension variation in the unit of percentage.

Thus, OGV takes into account the ratio between DoL (depth of layer) and glass thickness that is important for the final net geometry change of the thin glass of the present disclosure after chemical toughening. Furthermore, OGV takes into account the expansion of the glass upon chemical toughening by way of the parameter $V_1$. $V_1$ describes the relative geometry expansion of the glass after chemical toughening as compared to the dimensions of the glass prior to chemical toughening. For example, if chemical toughening results in a geometry expansion of 1000 ppm, $V_1$ is 0.1 because 1000 ppm=0.1% and $V_1$ is always provided in the unit of percentage.

OGV is on the one hand influenced by parameters related to the production process as for example the cooling rate and the glass thickness, and on the other hand by more intrinsic parameters as for example the glass composition and the network structure of the glass. According to the present disclosure, both production parameters and intrinsic parameters are chosen in order to achieve a high OGV. A high OGV is connected to low expansion upon chemical toughening. In some embodiments, OGV of the glasses of the present disclosure is higher than 0.8, such as higher than 1.0, higher than 1.2, higher than 1.5, higher than 1.8, higher than 2.0, higher than 2.2, higher than 2.4, or higher than 2.5. However, OGV should also not be extremely high. If OGV is very high, the glass may be susceptible to self-breakage. In some embodiments, OGV is lower than 10.0, such as lower than 8.0, lower than 6.0, lower than 5.0, or lower than 4.5.

The glass of the present disclosure is a thin glass. In some embodiments, the glass of the present disclosure has before chemical toughening a thickness of less than or equal to 1100 µm, such as less than or equal to 800 µm, less than or equal to 500 µm, less than or equal to 400 µm, less than or equal to 350 µm, less than or equal to 300 µm, less than or equal to 200 µm, less than or equal to 150 µm, less than or equal to 100 µm, less than or equal to 75 µm, less than or equal to 50 µm, less than or equal to 30 µm, less than or equal to 25 µm, or less than or equal to 15 µm. However, the glass thickness should not be extremely low because the glass may break too easily. Furthermore, glasses with extremely low thickness may have a limited processability and may be difficult to handle. In some embodiments, the glass thickness before chemical toughening is higher than 1 µm, such as higher than 2 µm.

In some embodiments, the glass has at least one surface with a roughness Ra of less than 5 nm, such as less than 2 nm, less than 1 nm, or less than 0.5 nm. The roughness can be measured with atomic force microscopy.

For the glass to be easily produced by drawing, the temperature difference ΔT between the working temperature $T_4$ (temperature at which the viscosity of the glass is $10^4$ dPas) and the maximum crystallization temperature $T_{OEG}$ is, in some embodiments, higher than 50 K, such as higher than 100 K, higher than 150 K, higher than 200 K, or higher than 250 K. $T_{OEG}$ can be easily measured by gradient furnace.

Within the present specification the terms "dPas" and "dPa·s" are used interchangeably.

In some embodiments, the glasses have a maximum crystallization temperature $T_{OEG}$ of from 900° C. to 1300° C., such as from 950° C. to 1250° C., from 1000° C. to 1200° C., or from 1050° C. to 1150° C.

In some embodiments, the glasses have a working temperature $T_4$ of from 1000° C. to 1500° C., such as from 1100° C. to 1400° C., from 1200° C. to 1375° C., or from 1225° C. to 1350° C.

The coefficient of linear thermal expansion (CTE) is a measure of characterizing the expansion behavior of a glass when it experiences certain temperature variation. The lower the CTE, the less expansion with temperature variation. Therefore, in the temperature range of from 20° C. to 300° C. the glasses may have a CTE of less than 12 ppm/K, such as less than 10.0 ppm/K, less than 9.0 ppm/K, less than 8.0 ppm/K, less than 7 ppm/K, or less than 6.5 ppm/K. However, the CTE should also not be very low. In some embodiments, in the temperature range of from 20° C. to 300° C. the CTE of the glasses is more than 3 ppm/K, such as more than 4 ppm/K, more than 5 ppm/K, or more than 6 ppm/K.

The glass is chemically toughenable or chemically toughened. Compressive stress (CS) and depth of layer (DoL) are parameters that are commonly used in order to describe the chemical toughenability of a glass. To some extent, a glass with highest possibility to achieve highest CS and DoL is expected from the different application fields. However, for a sample with certain thickness, the CS and DoL have to be controlled in a reasonable level. Otherwise, the glass will be broken due to too high CT (central tensile stress) in the glass, or the glass will have no mechanical performance advantage if the CS or DoL is too low. Certain value of achieved CS*DoL through chemical toughening, is a reflection or recording of the chemical toughening process conditions, including the salt bath composition, toughening steps, toughening temperature and time. If a usable CS and DoL can be achieved by different possibility of setting temperature and time, then a lower temperature and shorter time will be preferred, which can benefit not only the geometry variation of the glass sheet, but also the production cost.

The glass can be chemically toughened via one or more toughening processes, in particular via two subsequent toughening processes using different toughening agents. The toughened glass can have one ion-exchanged layer or multiple ion-exchanged layers along the cross section of the glass sheet. An example glass comprising a non-ion-exchanged bulk glass 3 and two outer ion exchange layers 1a, 1b as well two inner ion exchange layers 2a, 2b is shown in FIG. 1. Inner ion exchange layer 2a is positioned between the bulk glass 3 and outer ion exchange layer 1a. Inner ion exchange layer 2b is positioned between the bulk glass 3 and outer ion exchange layer 1b.

The depth of layer (DoL), indicating the total depth of ion exchange layers on one side of the glass as described above, may be more than 1 μm, such as more than 3 μm, more than 5 μm, more than 15 μm, more than 50 μm, more than 70 μm, more than 75 μm, or more than 100 μm. However, DoL should not be very high in comparison to the glass thickness. In some embodiments, DoL is less than 0.5*t, such as less than 0.3*t, less than 0.2*t, or less than 0.1*t, wherein t is the thickness of the glass.

The surface compressive stress (CS) may be higher than 0 MPa, such as higher than 50 MPa, higher than 100 MPa, higher than 200 MPa, higher than 300 MPa, higher than 400 MPa, higher than 500 MPa, higher than 600 MPa, higher than 700 MPa, higher than 800 MPa, or higher than 900 MPa. However, CS should not be very high because the glass may otherwise be susceptible to self-breakage. In some embodiments, CS is lower than 1500 MPa, such as lower than 1250 MPa.

The depth of ion exchange layer and surface compressive stress can be measured with a surface stress meter, in particular with FSM 6000.

The present disclosure comprises exemplary embodiments, in which there is only one ion exchange layer on either side of the chemically toughened glass. However, in some embodiments, a chemically toughened glass comprises an outer ion exchange layer and an inner ion exchange layer. The inner ion exchange layer is positioned between the outer ion exchange layer and the bulk glass. The bulk glass is the part of the glass that has not been ion exchanged (reference sign 3 in FIG. 1). An example of such embodiment is shown in FIG. 1. The glass shown in FIG. 1 comprises two outer ion exchange layers 1a and 1b and two inner ion exchange layers 2a and 2b. However, the present disclosure also comprises exemplary embodiments, in which only one side of the glass has been ion exchanged so that the glass comprises exactly one outer ion exchange layer and exactly one inner ion exchange layer.

In some embodiments, the molar concentration of $Na^+$ in the inner ion exchange layer is higher than the molar concentration of $Na^+$ in the outer ion exchange layer. In some embodiments, the molar concentration of $K^+$ in the inner ion exchange layer is lower than the molar concentration of $K^+$ in the outer ion exchange layer. In some embodiments, the molar concentration of $K^+$ in the inner ion exchange layer is lower than the molar concentration of $Na^+$ in the inner ion exchange layer. In some embodiments, the molar concentration of $K^+$ in the outer ion exchange layer is higher than the molar concentration of $Na^+$ in the outer ion exchange layer.

In some embodiments, the depth (thickness) of the inner ion exchange layer is at least as high as the depth (thickness) of the outer ion exchange layer. The ratio of the depth (thickness) of the inner ion exchange layer and the depth (thickness) of the outer ion exchange layer may be at least 1.3, such as at least 1.5, at least 2, or at least 4.

A glass comprising an outer ion exchange layer and an inner ion exchange layer may be obtained by chemically toughening the glass in two subsequent toughening steps with different toughening agents. The toughening agent used in the first step determines the inner ion exchange layer and the toughening agent used in the second step determines the outer ion exchange layer. In some embodiments, the first step comprises exchanging $Li^+$ ions for $Na^+$ ions. The first step may help to create a larger DoL. In some embodiments, the second step comprises exchanging $Na^+$ ions for $K^+$ ions. The second step may help to build a higher CS. Therefore, some embodiments will have more $Na^+$ concentration in the first toughening step and have more K concentration in the second toughening step. In some embodiments, the molar concentration of $Na^+$ in the toughening agent used in the first step is higher than the molar concentration of $Na^+$ in the toughening agent used in the second step. The molar concentration of $K^+$ in the toughening agent used in the first step may be lower than the molar concentration of $K^+$ in the toughening agent used in the second step. The molar concentration of $K^+$ in the toughening agent used in the first step may be lower than the molar concentration of $Na^+$ in the toughening agent used in the first step. The molar concentration of $K^+$ in the toughening agent used in the second step may be higher than the molar concentration of $Na^+$ in the toughening agent used in the second step.

In the present disclosure, the following glass compositions with an advantageous design of BO may be used.

$SiO_2$, forming the $[SiO_4]$ tetrahedra in the glass, is the most important network former in the glass. Without $SiO_2$ in the glass, the high mechanical strength and chemical stability of the glasses cannot be achieved. Therefore, the glasses comprise $SiO_2$ in an amount of at least 45 mol-%. In some embodiments, the glasses comprise $SiO_2$ in an amount of at least 50 mol-%, such as at least 55 mol-%, at least 60 mol-%, more than 63 mol-%, or even more than 65 mol-%. However, the content of $SiO_2$ in the glass should also not be extremely high because otherwise the meltability may be compromised. The amount of $SiO_2$ in the glass is at most 75 mol-%, such as at most 70 mol-%. In some embodiments, the content of $SiO_2$ in the glass is from 45 to 75 mol-%, such as from >63 to 75 mol-%.

$B_2O_3$ may be used in order to enhance the network by increasing the bridge-oxide in the glass via the form of $[BO_4]$ tetrahedra. It also helps to improve the damage resistance of the glass. However, $B_2O_3$ should not be used in high amounts in the chemically toughenable glass since it can decrease the ion-exchange performance. Furthermore, addition of $B_2O_3$ can significantly reduce the Young's modulus. Therefore, the total effect of adding $B_2O_3$ to the geometry variation is usually neutral. The glass comprises $B_2O_3$ in an amount of from 0 to 8 mol-%, such as from 1 to 5 mol-%. In some embodiments, the glass comprises at least 0.5 mol-%, such as at least 1 mol-% or at least 2 mol-% of $B_2O_3$.

$P_2O_5$ may be used in the silicate glass in order to help lowering the melting viscosity by forming $[PO_4]$ tetrahedra, which can significantly lower the melting point without sacrificing anti-crystallization features. Limited amounts of $P_2O_5$ do not increase geometry variation very much, but can significantly improve the glass melting and forming performance. However, if high amounts of $P_2O_5$ are used, geometry expansion upon chemical toughening may be increased significantly. Therefore, the glasses comprise $P_2O_5$ in an amount of from 0 to 15 mol-%, such as from 0 to 10 mol-% or from 1 to 5 mol-%. In some embodiments, the glass comprises at least 0.5 mol-%, such as at least 1 mol-% or at least 2 mol-% of $P_2O_5$.

It is believed that $Al_2O_3$ can easily form tetrahedra coordination when the alkaline oxide ratio content is equal or higher than that of $Al_2O_3$. $[AlO_4]$ tetrahedra coordination can help building up more compact network together with $[SiO_4]$ tetrahedra, which can result in a low geometry variation of the glass. $[AlO_4]$ tetrahedra can also dramatically enhance the ion-exchange process during the chemical toughening. Moreover, when using $Al_2O_3$ to replace part of $SiO_2$ in the glass, the glass can have a higher dielectric loss, which can benefit a lot for the FPS (figure print sensor) application. Therefore, $Al_2O_3$ may be contained in the glasses in an amount of at least 10 mol-%, such as of more than 11 mol-% or of more than 12 mol-%. However, the amount of $Al_2O_3$ should also not be very high because otherwise the viscosity may be very high so that the meltability may be impaired. Therefore, the content of $Al_2O_3$ in the glasses may be at most 25 mol-%, such as at most 22 mol-% or at most 18 mol-%. In some embodiments, the content of $Al_2O_3$ in the glasses is from 10 to 25 mol-%, such as from >11 to 25 mol-%, from >12 to 25 mol-%, from >12 to 22 mol-%, or from >12 to 18 mol-%.

$TiO_2$ can also form $[TiO_4]$ and can thus help building up the network of the glass, and may also be beneficial for improving the acid resistance of the glass. However, the amount of $TiO_2$ in the glass should not be very high. $TiO_2$ present in high concentrations may function as a nucleating agent and may thus result in crystallization during manufacturing. In some embodiments, the content of $TiO_2$ in the glasses is from 0 to 5 mol-%. In some embodiments, the glass comprises at least 0.5 mol-%, such as at least 1 mol-% or at least 2 mol-% of $TiO_2$.

$ZrO_2$ has the functions of lowering the CTE and improving the basic resistance of a glass. It may increase the melting viscosity, which can be suppressed by using $P_2O_5$. Like alkaline metals, $Zr^{4+}$ is also a network modifier. Furthermore, $ZrO_2$ is a significant contributor for increased Young's modulus. In some embodiments, the content of $ZrO_2$ in the glasses of the invention is from 0 to 5 mol-%. In some embodiments, the glass comprises at least 0.5 mol-%, such as at least 1 mol-% or at least 2 mol-% of $ZrO_2$.

Alkaline oxides $R_2O$ ($Li_2O+Na_2O+K_2O+Cs_2O$) are used as network modifiers to supply sufficient oxygen anions to form the glass network. In some embodiments, the content of $R_2O$ in the glasses is more than 10 mol-%, such as more than 15 mol-%. However, the content of $R_2O$ in the glasses should not be very high because otherwise chemical stability and chemical toughenability may be impaired. In some embodiments, the glasses of the invention comprise $R_2O$ in an amount of at most 30 mol-%, such as at most 25 mol-% or at most 20 mol-%.

$Li_2O$ can help improve the Young's modulus and lower CTE of the glass. $Li_2O$ also influences the ion-exchange greatly. Even surprisingly found, with the same DoL/t, Li-containing glass has smaller geometry variation. Therefore, the content of $Li_2O$ in the glasses is more than 1 mol-%, such as more than 2.5 mol-%. However, the content of $Li_2O$ should not be very high because otherwise chemical stability and chemical toughenability may be impaired. In some embodiments, the content of $Li_2O$ in the glasses is at most 11 mol-%, such as less than 8 mol-%.

$Na_2O$ may be used as a network modifier. However, the content of $Na_2O$ should not be very high because otherwise chemical stability and chemical toughenability may be impaired. In some embodiments, the content of $Na_2O$ in the glasses is from 0 to 15 mol-%. In some embodiments, the content of $Na_2O$ in the glasses is at least 1 mol-%, such as at least 3 mol-% or at least 5 mol-%.

$K_2O$ may be used as a network modifier. However, the content of $K_2O$ should not be very high because otherwise chemical stability and chemical toughenability may be impaired. In some embodiments, the content of $K_2O$ in the glasses is from 0 to 5 mol-%, such as from >0.5 to 5 mol-%.

In some embodiments, the glasses comprise more $Na_2O$ than $K_2O$. Thus, the molar ratio $Na_2O/(Na_2O+K_2O)$ may be from >0.5 to 1.0, such as from >0.6 to 1.0, from >0.7 to 1.0, or from >0.8 to 1.0.

In some embodiments, the content of the sum of $Li_2O$ and $Na_2O$ in the glasses is more than 10 mol-%, such as more than 15 mol-%. However, the content of the sum of $Li_2O$ and $Na_2O$ in the glasses should not be very high. In some embodiments, the content of the sum of $Li_2O$ and $Na_2O$ in the glasses is at most 25 mol-%, such as at most 20 mol-%.

By adjusting the $Li_2O$ content ratio in the alkaline oxides ($Li_2O/(Li_2O+Na_2O+K_2O)$), it can help manipulate the material property of Young's modulus and CTE. Increasing the $Li_2O$ ratio can help improving the Young's modulus and lowering CTE of the glass. $Li_2O$ also influences the ion-exchange greatly. Even surprisingly found, with the same DoL/t, Li-containing glass has smaller geometry variation. Therefore, in some embodiments the molar ratio $Li_2O/$ ($Li_2O+Na_2O+K_2O$) is larger than 0.1, such as larger than 0.2, larger than 0.3, or larger than 0.4. However, the $Li_2O$ content ratio in the alkaline oxides should not be very high because otherwise the ion-exchange process may be impaired. In some embodiments, the molar ratio $Li_2O/(Li_2O+Na_2O+K_2O)$ is at most 0.6, such as at most 0.5.

In some embodiments, the molar ratio $Na_2O/(Li_2O+Na_2O+K_2O)$ is from 0.3 to 0.9, such as from 0.4 to 0.8 or from >0.5 to 0.7.

The glasses may also comprise alkaline earth metal oxides as well as ZnO which are collectively termed "RO" herein. Alkaline earth metals and Zn may serve as network modifiers. In some embodiments, the glasses comprise RO in an amount of from 0 to 10 mol-%. In some embodiments, the glass comprises at least 0.5 mol-%, such as at least 1 mol-% or at least 2 mol-% of RO.

Exemplary alkaline earth metal oxides are selected from the group consisting of MgO, CaO, SrO and BaO.

In some embodiments, the glass of the invention comprises MgO in an amount of from 0 to 5 mol-%. In some embodiments, the glass comprises at least 0.5 mol-%, such as at least 1 mol-% or at least 2 mol-% of MgO.

In some embodiments, the glass comprises ZnO in an amount of from 0 to 5 mol-%. In some embodiments, the glass comprises at least 0.5 mol-%, such as at least 1 mol-% or at least 2 mol-% of ZnO.

In some embodiments, the content of the sum of MgO and ZnO in the glasses is from 0 to 10 mol-%. In some embodiments, the content of the sum of MgO and ZnO in the glasses is at least 0.5 mol-%, such as at least 1 mol-% or at least 2 mol-%.

At the end, when forming a glass by mixing different type of the oxides, the integrated effect should be considered to achieve a glass with low expansion, which requires high densification of the glass network. It means, in addition to $[SiO_4]$ tetrahedra, $[BO_4]$ tetrahedra, $[AlO_4]$ tetrahedra, $[PO_4]$ tetrahedra are expected to help connect the $[SiO_4]$ more effectively rather than other type of polyhedrons. In other words, $[BO_3]$ triangle and $[AlO_6]$ octahedron, for instance, are not preferred. It means, sufficient oxygen anions are preferable to be offered by adding proper amounts of metal oxides, such as $R_2O$ and RO.

In some embodiments, the content of $SnO_2$ in the glasses is from 0 to 3 mol-%. In some embodiments, the glasses are free of $SnO_2$.

In some embodiments, the content of $Sb_2O_3$ in the glasses is from 0 to 3 mol-%. In some embodiments, the glasses are free of $Sb_2O_3$.

In some embodiments, the content of $CeO_2$ in the glasses is from 0 to 3 mol-%. High contents of $CeO_2$ are disadvantages because $CeO_2$ has a coloring effect. Therefore, the glasses may be free of $CeO_2$.

In some embodiments, the content of $Fe_2O_3$ in the glasses is from 0 to 3 mol-%. In some embodiments, the glasses are free of $Fe_2O_3$.

In some embodiments, the glass consists of the components mentioned herein to an extent of at least 95%, such as at least 97% or at least 99%. In some embodiments, the glass essentially consists of the components mentioned herein.

The terms "X-free" and "free of component X", respectively, as used herein, may refer to a glass, which essentially does not comprise said component X, i.e. such component may be present in the glass at most as an impurity or contamination, however, is not added to the glass composition as an individual component. This means that the component X is not added in essential amounts. Non-essential amounts according to the present disclosure are amounts of less than 100 ppm, such as less than 50 ppm or less than 10 ppm. In some embodiments, the glasses described herein do essentially not contain any components that are not mentioned here.

In some embodiments provided in accordance with the present disclosure, a method for producing a previously described glass comprises the steps of a) providing a composition, b) melting the composition, and c) producing a glass from the melted composition.

The glass composition that is provided according to step a) is a composition that is suitable for obtaining a glass provided according to the present disclosure.

The method may optionally comprise further steps. Further steps may be, for example, chemically toughening the glass. In some embodiments, chemical toughening is done in a salt bath, in particular in a bath of molten salt. The glass may be toughened with Na, K or Cs nitrate, sulfate or chloride salts or a mixture of one or more thereof as a toughening agent. In some embodiments, the glass is toughened with $NaNO_3$, $KNO_3$ or both $KNO_3$ and $NaNO_3$ as toughening agents. In some embodiments, chemical toughening comprises at least one toughening step comprising toughening in a toughening agent comprising $KNO_3$. In some embodiments, the glass is toughened with $KNO_3$ only or with both $KNO_3$ and $NaNO_3$ as toughening agents. In embodiments in which chemical toughening is done with $KNO_3$ only, chemical toughening may be done in a single step.

In some embodiments, chemical toughening comprises multiple toughening steps, wherein the initial step comprises toughening with a first toughening agent and the following step/steps comprises toughening with a second or more toughening agents. Chemical toughening may comprise two consecutive toughening steps, wherein the first step comprises toughening with a first toughening agent and the second step comprises toughening with a second toughening agent.

Chemical toughening with both $KNO_3$ and $NaNO_3$ may be done by using mixtures of $KNO_3$ and $NaNO_3$ as toughening agents or by performing separate toughening steps with pure $NaNO_3$ and pure $KNO_3$ as toughening agents. If chemical toughening is done with pure $NaNO_3$ and pure $KNO_3$ as toughening agents, chemical toughening with $NaNO_3$ may be done prior to chemical toughening with $KNO_3$. In other words, in such embodiments the $NaNO_3$ may be used as a first toughening agent and $KNO_3$ is used as a second toughening agent.

In embodiments in which the glass is chemically toughened with mixtures of $KNO_3$ and $NaNO_3$ as toughening agents, multiple consecutive toughening steps may be performed, wherein the first step comprises toughening with a first toughening agent and the following step/steps comprises toughening with different toughening agents. In some embodiments, exactly two consecutive toughening steps are performed, wherein the first step comprises toughening with a first toughening agent and the second step comprises toughening with a second toughening agent. The mixtures of $KNO_3$ and $NaNO_3$ used as first and second toughening agent, respectively, may consist of $KNO_3$ and $NaNO_3$. In other words, the contents of $NaNO_3$ and $KNO_3$ in each mixture may sum up to 100%. In some embodiments, the proportion of $KNO_3$ in the second toughening agent is higher than the proportion of $KNO_3$ in the first toughening agent. In some embodiments, the proportion of $NaNO_3$ in the second toughening agent is lower than the proportion of $NaNO_3$ in the first toughening agent.

It should be noted that the embodiments described herein with regard to chemical toughening with $KNO_3$, $NaNO_3$ and/or mixtures thereof represent exemplary embodiments that are presented for illustration of the present disclosure. However, as mentioned above other salts of potassium and/or sodium may be used as well, in particular sulfate salts or chloride salts of potassium and/or sodium.

Chemical toughening with both potassium salts and sodium salts may be done by using mixtures of potassium salt and sodium salt as toughening agents or by performing separate toughening steps with pure sodium salt and pure potassium salt as toughening agents. If chemical toughening is done with pure sodium salt and pure potassium salt as toughening agents, chemical toughening with sodium salt may be done prior to chemical toughening with potassium salt. In other words, in such embodiments the sodium salt may be used as a first toughening agent and potassium salt used as a second toughening agent.

In embodiments in which the glass is chemically toughened with mixtures of potassium salt and sodium salt as toughening agents, multiple consecutive toughening steps may be performed, wherein the first step comprises toughening with a first toughening agent and the following step/steps comprises toughening with different toughening agents. In some embodiments, exactly two consecutive toughening steps are performed, wherein the first step comprises toughening with a first toughening agent and the second step comprises toughening with a second toughening agent. In some embodiments, the mixtures of potassium salt and sodium salt used as first and second toughening agent, respectively, consist of the potassium salt and the sodium salt. In other words, the contents of sodium salt and potassium salt in each mixture may sum up to 100%. In some embodiments, the proportion of potassium salt in the second toughening agent is higher than the proportion of potassium salt in the first toughening agent. In some embodiments, the proportion of sodium salt in the second toughening agent is lower than the proportion of sodium salt in the first toughening agent.

In some embodiments, the mixture of $KNO_3$ and $NaNO_3$ used as first toughening agent comprises $KNO_3$ in amount of from 1 to 60 wt.-% and $NaNO_3$ in an amount of from 40 to 99 wt.-%, such as $KNO_3$ in amount of from 20 to 60 wt.-% and $NaNO_3$ in an amount of from 40 to 80 wt.-%. In some embodiments, the mixture of $KNO_3$ and $NaNO_3$ used as second toughening agent comprises $NaNO_3$ in amount of from 1 to 40 wt.-% and $KNO_3$ in an amount of from 60 to 99 wt.-%, such as $NaNO_3$ in amount of from 5 to 35 wt.-% and $KNO_3$ in an amount of from 65 to 95 wt.-%.

By chemically toughening the glass in two subsequent toughening steps with different toughening agents as described above, a glass comprising an outer ion exchange layer and an inner ion exchange layer can be obtained.

If the toughening temperature is very low, the toughening rate will be low. In some embodiments, chemical toughening may be done at a temperature of more than 320° C., such as more than 350° C., more than 380° C., or at a temperature of at least 400° C. However, the toughening temperature should not be very high because very high temperatures may result in strong CS relaxation and low CS. In some embodiments, chemical toughening is done at a temperature of less than 500° C. or less than 450° C.

As described above, chemical toughening is may be either done in a single step or in multiple steps, in particular in two steps. If the duration of toughening is very low, the resulting DoL may be very low. If the duration of toughening is very high, the CS may be relaxed very strongly. The duration of each toughening step may be between 0.05 and 15 hours, such as between 0.2 and 10 hours, between 0.5 and 6 hours, or between 1 and 4 hours. The total duration of chemical toughening, in particular the sum of the duration of the two separate toughening steps, may be between 0.01 and 20 hours, such as between 0.2 and 20 hours, between 0.5 and 15 hours, between 1 and 10 hours, or between 1.5 and 8.5 hours.

In some embodiments, the glasses are produced in a flat glass process. Very thin glasses can be obtained by flat glass processes. Therefore, it is an advantage of the glasses that they can be obtained by a flat glass process. Flat glass processes are well known to the skilled person. According to the present disclosure, the flat glass processes may be selected from the group consisting of pressing, down-draw, re-draw, overflow fusion, floating and rolling.

The glass may be used in all types of sensors, such as touch sensors, iris sensors, health sensors, ToF sensors, illumination sensors, distance sensors, proximity sensors, in particular in such sensors in mobile devices. The glass may also be used in all types of flash lights and lighting, in particular in mobile devices. The glass may also be used as cover glass and/or sealing glass of OLEDs and also as device cover on displays and as a non-display cover, in particular as cover glass for finger print sensors.

Examples

Example glass substrates and example filters were prepared and some properties were measured. The glass compositions tested can be seen in Table 1 below.

Composition Examples

The following Tables 1 and 2 show exemplary glass compositions in mol-%. Glasses S1 to S15 are representative examples provided according to the present disclosure. Glass S16 is a comparative example that does not comprise lithium.

TABLE 1

| Glass | S1 | S2 | S3 | S4 | S5 | S6 | S7 | S8 |
|---|---|---|---|---|---|---|---|---|
| $SiO_2$ | 45.0 | 48.0 | 50.0 | 52.0 | 46.5 | 70.0 | 62.0 | 57.5 |
| $Al_2O_3$ | 25.0 | 20.0 | 23.0 | 22.0 | 18.5 | 13.0 | 16.0 | 21.0 |
| $Na_2O$ | 9.0 | 8.0 | 5.0 | 6.0 | 13.0 | 10.0 | 7.0 | 6.0 |
| $K_2O$ | 0 | 1.0 | 3.0 | 1.0 | 2.0 | 0 | 1.0 | 4.0 |
| MgO | 2.0 | 4.0 | 1.0 | 3.0 | 3.0 | 0.5 | 2.0 | 0 |
| $B_2O_3$ | 3.0 | 4.0 | 2.0 | 1.0 | 0 | 0.5 | 0 | 0.5 |
| $Li_2O$ | 8.0 | 3.0 | 5.0 | 9.0 | 4.0 | 5.0 | 3.0 | 4.0 |
| ZnO | 0 | 5.0 | 1.0 | 0 | 5.0 | 0.5 | 3.0 | 1.0 |
| $ZrO_2$ | 5.0 | 1.0 | 3.0 | 1.0 | 1.0 | 0 | 4.0 | 1.0 |
| $TiO_2$ | 2.0 | 1.0 | 3.0 | 2.0 | 5.0 | 0 | 1.0 | 0 |
| $P_2O_5$ | 1.0 | 5.0 | 4.0 | 3.0 | 2.0 | 0.5 | 1.0 | 5.0 |

TABLE 1-continued

| Glass | S1 | S2 | S3 | S4 | S5 | S6 | S7 | S8 |
|---|---|---|---|---|---|---|---|---|
| Sum all | 100 | 100 | 100 | 100 | 100 | 100 | 100 | 100 |
| $c_{mol}$ (O) | 212.00 | 218.00 | 222.00 | 213.00 | 197.50 | 199.00 | 203.00 | 221.50 |
| $c_{mol}$ (Si, Al, B, P, Ti) | 105.00 | 107.00 | 111.00 | 106.00 | 92.50 | 98.00 | 97.00 | 110.50 |
| R = $c_{mol}$ (O)/$c_{mol}$ (Si, Al, B, P, Ti) | 2.02 | 2.04 | 2.00 | 2.01 | 2.14 | 2.03 | 2.09 | 2.00 |
| BO = Y = 2*4 − 2*R | 3.962 | 3.925 | 4.000 | 3.981 | 3.730 | 3.939 | 3.814 | 3.991 |
| $Li_2O + Na_2O$ | 17.0 | 11.0 | 10.0 | 15.0 | 17.0 | 15.0 | 10.0 | 10.0 |
| $Na_2O/(Na_2O + K_2O)$ | 1.00 | 0.89 | 0.63 | 0.86 | 0.87 | 1.00 | 0.88 | 0.60 |
| $Li_2O/(Li_2O + Na_2O + K_2O)$ | 0.47 | 0.25 | 0.38 | 0.56 | 0.21 | 0.33 | 0.27 | 0.29 |
| $Na_2O/(Li_2O + Na_2O + K_2O)$ | 0.53 | 0.67 | 0.38 | 0.38 | 0.68 | 0.67 | 0.64 | 0.43 |

The compositions above are the final compositions measured in the glass. The skilled person knows how to obtain these glasses by melting the necessary raw materials.

TABLE 2

| Glass | S9 | S10 | S11 | S12 | S13 | S14 | S15 | S16 |
|---|---|---|---|---|---|---|---|---|
| $SiO_2$ | 65.0 | 65.0 | 62.5 | 64.0 | 65.0 | 66.1 | 63.8 | 65.8 |
| $Al_2O_3$ | 10.0 | 15.0 | 15.5 | 14.0 | 12.0 | 11.2 | 10.7 | 10.9 |
| $Na_2O$ | 12.0 | 10.0 | 11.0 | 10.0 | 10.6 | 9.6 | 9.0 | 13.3 |
| $K_2O$ | 2.0 | 2.0 | 0 | 0 | 0 | 0.1 | 2.9 | 2.8 |
| MgO | 1.0 | 4.0 | 0 | 0 | 0 | 0 | 6.8 | 6.5 |
| $B_2O_3$ | 2.0 | 1.0 | 0.5 | 0 | 0 | 0.6 | 0 | 0 |
| $Li_2O$ | 4.0 | 1.0 | 7.0 | 9.0 | 9.0 | 10.6 | 4.0 | 0 |
| ZnO | 2.5 | 0 | 1.3 | 0.7 | 0 | 0 | 0 | 0 |
| $ZrO_2$ | 0.5 | 0 | 0 | 1.2 | 1.6 | 1.9 | 0.8 | 0.7 |
| $TiO_2$ | 1.0 | 0 | 0 | 0 | 0 | 0 | 0 | 0 |
| $P_2O_5$ | 0 | 2.0 | 2.2 | 1.1 | 1.8 | 0 | 2.0 | 0 |
| Sum all | 100 | 100 | 100 | 100 | 100 | 100 | 100 | 100 |
| $c_{mol}$ (O) | 190.50 | 205.00 | 203.30 | 197.6 | 197.800 | 191.46 | 193.93 | 188.3 |
| $c_{mol}$ (Si, Al, B, P, Ti) | 90.00 | 101.00 | 98.90 | 94.20 | 92.60 | 89.64 | 89.18 | 87.59 |
| R = $c_{mol}$ (O)/$c_{mol}$ (Si, Al, B, P, Ti) | 2.12 | 2.03 | 2.06 | 2.10 | 2.14 | 2.15 | 2.16 | 2.15 |
| BO = Y = 2*4 − 2*R | 3.767 | 3.941 | 3.889 | 3.805 | 3.728 | 3.728 | 3.651 | 3.701 |
| $Li_2O + Na_2O$ | 16 | 11 | 18 | 19 | 19.6 | 20.19 | 13.00 | 13.30 |
| $Na_2O/(Na_2O + K_2O)$ | 0.86 | 0.83 | 1.00 | 1.00 | 1.00 | 0.99 | 0.76 | 0.82 |
| $Li_2O/(Li_2O + Na_2O + K_2O)$ | 0.22 | 0.08 | 0.39 | 0.47 | 0.46 | 0.52 | 0.25 | 0 |
| $Na_2O/(Li_2O + Na_2O + K_2O)$ | 0.67 | 0.77 | 0.61 | 0.53 | 0.54 | 0.47 | 0.57 | 0.82 |

The compositions above are the final compositions measured in the glass. The skilled person knows how to obtain these glasses by melting the necessary raw materials.

Producing and Chemical Toughening of Glasses

Glasses were produced by down draw using suitable raw materials to obtain the final compositions shown in Tables 1 and 2. The average cooling rate in the temperature region corresponding to a glass viscosity of $10^{10}$ dPas to $10^{15}$ dPas was 50° C./s. The glasses had the properties as shown in the following Tables 3 and 4.

The glasses were chemically toughened. The conditions of chemical toughening are indicated in the following Tables 3 and 4. Notably, glasses S1 to S9, S11, S13 and S14 were toughened in two separate toughening steps with different toughening agents. Glasses S10, S12, S15 and S16 were toughened in a single toughening step. Depth of the ion-exchange layer (DoL), CS and expansion after chemical toughening were determined. Results are shown in the following Tables 3 and 4.

TABLE 3

| Glass | S1 | S2 | S3 | S4 | S5 | S6 | S7 | S8 |
|---|---|---|---|---|---|---|---|---|
| $T_g$ | 677.0 | 682.2 | 793.9 | 665.1 | 664.0 | 627.9 | 734.4 | 730.9 |
| $T_4$ | 1370 | 1192 | 1308 | 1218 | 1223 | 1331 | 1345 | 1370 |
| $T_{OEG}$ | 1200 | 960 | 1211 | 1050 | 1084 | 1150 | 1203 | 1135 |
| $\Delta T = (T_4 - T_{OEG})$ | 170 | 232 | 97 | 168 | 139 | 181 | 142 | 235 |
| CTE [ppm/K] | 7.28 | 6.77 | 6.88 | 6.90 | 7.74 | 6.82 | 6.23 | 7.21 |
| Young's modulus [GPa] | 87 | 80 | 80 | 84 | 79 | 78 | 79 | 78 |
| GVACT = BO*Young's modulus | 343 | 314 | 320 | 336 | 294 | 306 | 301 | 309 |
| t = Sample thickness [μm] | 500 | 100 | 100 | 200 | 250 | 350 | 400 | 450 |
| Toughening agents (K = KNO3; Na = NaNO3. 40/60 = 40%:60%) | Two steps: 1. K/Na 30/70; 2. K/Na 90/10 | Two steps: 1. K/Na 33/67; 2. K/Na 85/15 | Two steps: 1. K/Na 35/65; 2. K/Na 80/20 | Two steps: 1. K/Na 25/75; 2. Pure K | Two steps: 1. K/Na 20/80; 2. K/Na 80/20 | Two steps: 1. Pure Na 2. Pure K | Two steps: 1. Pure Na 2. Pure K | Two steps: 1. Pure Na 2. Pure K |
| Toughening temperature [° C.] | 410 | 410 | 410 | 410 | 420 | 400 | 400 | 400 |
| Toughening time [hours] (Step 1/Step 2) | 2/1 | 0.3/0.5 | 0.4/0.4 | 1/0.6 | 1.5/1 | 2/1.2 | 2/1.2 | 3/1 |
| CS [MPa] | 830.0 | 680.0 | 690.0 | 713.0 | 653.0 | 729.0 | 670.0 | 751.0 |
| Depth (thickness) of outer ion exchange layer/ inner ion exchange layer [μm] | 7/82 | 7/18 | 5/28 | 9/58 | 10/66 | 6/88 | 7/84 | 13/110 |
| DoL [μm] | 89 | 25 | 33 | 67 | 76 | 94 | 91 | 123 |
| $V_1$ = Expansion after chemical toughening [%] | 0.081 | 0.125 | 0.121 | 0.114 | 0.137 | 0.113 | 0.116 | 0.115 |
| OGV = (DoL/t)/$V_1$ | 2.20 | 2.00 | 2.73 | 2.94 | 2.22 | 2.38 | 1.96 | 2.38 |

TABLE 4

| Glass | S9 | S10 | S11 | S12 | S13 | S14 | S15 | S16 |
|---|---|---|---|---|---|---|---|---|
| $T_g$ | 519.1 | 693.3 | 600 | 525 | 540 | 505 | 590 | 618 |
| $T_4$ | 1047 | 1280 | 1346 | 1235 | 1258 | 1200 | 1305 | 1295 |
| $T_{OEG}$ | 837 | 1104 | 1158 | 1024 | 1046 | 1010 | 1105 | 1115 |
| $\Delta T = (T_4 - T_{OEG})$ | 210 | 176 | 188 | 211 | 212 | 190 | 200 | 180 |
| CTE [ppm/K] | 7.77 | 7.06 | 7.86 | 8.20 | 7.90 | 8.50 | 9.00 | 8.80 |
| Young's modulus [GPa] | 80 | 80 | 77 | 80 | 76 | 83 | 73 | 73 |
| GVACT = BO*Young's modulus | 300 | 315 | 298 | 304 | 283 | 309 | 268 | 270 |
| t = Sample thickness [μm] | 500 | 50 | 500 | 100 | 200 | 350 | 250 | 300 |
| Toughening agents (K = KNO3; Na = NaNO3. 40/60 = 40%:60%) | Two steps: 1. Pure Na 2. Pure K | One step: Pure K | Two steps: 1. K/Na 40/60; 2. K/Na 80/20 | One step: Pure K | Two steps: 1. K/Na 40/60; 2. K/Na 80/20 | Two steps: 1. Pure Na 2. Pure K | Two steps: 1. K/Na 40/60 2. K/Na 90/10 | One step: Pure K |
| Toughening temperature [° C.] | 400 | 400 | 400 | 410 | 410 | 420 | 420 | 420 |
| Toughening time [hours] (Step 1/Step 2) | 4/2.5 | 1 | 2/0.5 | 2 | 0.5/0.3 | 1/4 | 1.5/1 | 4 |
| CS [MPa] | 690 | 672 | 800 | 720 | 730 | 800 | 850 | 860 |
| Depth (thickness) of outer ion exchange layer/ inner ion exchange layer [μm] | 9/98 | 20 | 10/120 | 10 | 9/73 | 5/90 | 20/71 | 41 |
| DoL [μm] | 107 | 20 | 130 | 10 | 82 | 95 | 91 | 41 |
| $V_1$ = Expansion after chemical toughening [%] | 0.119 | 0.132 | 0.103 | 0.113 | 0.141 | 0.080 | 0.121 | 0.101 |
| OGV = (DoL/t)/$V_1$ | 1.80 | 3.03 | 2.52 | 0.88 | 2.91 | 3.39 | 3.01 | 1.35 |

The results confirm that thin glasses with low expansion after chemical toughening were obtained by providing glass compositions of the present disclosure with high BO values and thus dense glass networks and producing respective glasses with suitable production parameters of the present disclosure, in particular with a suitable cooling rate as indicated above.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

LIST OF REFERENCE SIGNS

1*a* Outer ion exchange layer
1*b* Outer ion exchange layer
2*a* Inner ion exchange layer
2*b* Inner ion exchange layer 3 Bulk glass
4a Ion exchange region
4b Ion exchange region
5 Glass

What is claimed is:

1. A chemically toughenable or toughened glass having before chemical toughening a thickness t of less than or equal to 500 μm, the glass comprising the following components in mol-%:
SiO$_2$ 45-75;
Al$_2$O$_3$ 12-25;
Li$_2$O >1-11;
P$_2$O$_5$ 0-15;
B$_2$O$_3$ 0-8;
TiO2 0-5; and
Na$_2$O in an amount of at least 3 mol-%;
wherein an average number of bridging oxygen per polyhedron (BO) calculated as 2*4−2*(c$_{mol}$(O)/(c$_{mol}$(Si)+c$_{mol}$(Al)+c$_{mol}$(B)+c$_{mol}$(P)+c$_{mol}$(Ti))) is higher than 3.55 and wherein upon chemical toughening a linear dimension variation in the unit of percentage V$_1$ is so low that an overall geometry variation OGV calculated as (DoL/O/V$_1$ is higher than 0.8, wherein DoL is a total depth of all ion-exchange layers on one side of the glass and wherein DoL is from >3 μm to <0.5*t when the glass is chemically toughened with NaNO$_3$ only, KNO$_3$ only, or with both KNO$_3$ and NaNO$_3$, wherein a molar ratio of Li$_2$O/(Li$_2$O+Na$_2$O+K$_2$O) is larger than 0.20.

2. The glass of claim 1, wherein the glass has a Young's modulus of from 60 GPa to 120 GPa.

3. The glass of claim 1, wherein a geometry variation after chemical toughening GVACT calculated as GVACT=BO*Young's modulus is from >250 GPa to <500 GPa.

4. The glass of claim 1, wherein BO is from >3.6 to 4.0.

5. The glass of claim 1, wherein OGV is from >1.0 to <10.0.

6. The glass of claim 1, wherein the thickness t of the glass before chemical toughening is >6 μm.

7. The glass of claim 1, wherein the glass has at least one surface with a roughness Ra of less than 5 nm.

8. The glass of claim 1, wherein a temperature difference ΔT between a working temperature T$_4$ and a maximum crystallization temperature T$_{OEG}$ of the glass is higher than 50 K.

9. The glass of claim 1, wherein the glass has a coefficient of thermal expansion CTE of from 3 ppm/K to 12 ppm/K in a temperature range of from 20° C. to 300° C.

10. The glass of claim 1, wherein a surface compressive stress CS of the glass after chemical toughening is from >0 MPa to <1500 MPa.

11. The glass of claim 1, wherein the glass comprises an outer ion exchange layer and an inner ion exchange layer after chemical toughening, wherein the inner ion exchange layer is positioned between the outer ion exchange layer and a bulk glass, wherein the bulk glass is the part of the glass that has not been ion exchanged.

12. The glass of claim 11, wherein a molar concentration of Na$^+$ in the inner ion exchange layer is higher than a molar concentration of Na$^+$ in the outer ion exchange layer.

13. The glass of claim 11, wherein a molar concentration of K$^+$ in the inner ion exchange layer is lower than a molar concentration of K$^+$ in the outer ion exchange layer.

14. The glass of claim 11, wherein a molar concentration of K$^+$ in the inner ion exchange layer is lower than a molar concentration of Na$^+$ in the inner ion exchange layer.

15. The glass of claim 11, wherein a molar concentration of K$^+$ in the outer ion exchange layer is higher than a molar concentration of Na$^+$ in the outer ion exchange layer.

16. The glass of claim 11, wherein a thickness of the inner ion exchange layer is at least as high as a thickness of the outer ion exchange layer.

17. The glass of claim 1, wherein the glass comprises at least one of the following:
a content of ZrO$_2$ from 0 to 5 mol-%;
a content of alkali metal oxides R$_2$O from 10 to 30 mol-%;
a content of Na$_2$O from 3 to 15 mol-%;
a content of K$_2$O from 0 to 5 mol-%;
a content of the sum of Li$_2$O and Na$_2$O from 10 to 25 mol-%;
a content of MgO from 0 to 5 mol-%;
a content of ZnO from 0 to 5 mol-%;
a content of the sum of MgO and ZnO from 0 to 10 mol-%;
a content of at least one of SnO$_2$, SbO$_2$, CeO$_2$ or Fe$_2$O$_3$ from 0 to 3 mol-%; or
a content of Al$_2$O$_3$ from >12 to 22 mol-%.

18. The glass of claim 1, wherein a molar ratio of Na$_2$O/(Na$_2$O+K$_2$O) is from >0.5 to 1.0.

19. The glass of claim 1, wherein a molar ratio of Li$_2$O/(Li$_2$O+Na2O+K$_2$O) is from >0.1 to 0.6.

20. The glass of claim 1, wherein the glass comprises the following components in mol-%:
Li$_2$O >1-<8; and
K$_2$O 0-5.

21. The glass of claim 1, wherein the glass comprises the following components in mol-%:
SiO$_2$ >63-75;
Al$_2$O$_3$ 12-25;
Li$_2$O >2.5-<8;
P$_2$O$_5$ 0-10;
B$_2$O$_3$ 1-5; and
K$_2$O >0.5-5.

22. A method for producing a glass, the method comprising the steps of:
a) providing a composition;
b) melting the composition;
c) producing the glass from the melted composition; and
d) chemically toughening the glass, the glass having before chemical toughening a thickness t of less than or equal to 500 μm, the glass comprising the following components in mol-%:
SiO$_2$ 45-75;
Al$_2$O$_3$ 12-25;
Li$_2$O >1-11;
P$_2$O$_5$ 0-15;
B$_2$O$_3$ 0-8;
TiO$_2$ 0-5; and
Na$_2$O in an amount of at least 3 mol-%;
wherein an average number of bridging oxygen per polyhedron BO calculated as 2*4−2*(c$_{mol}$(O)/(c$_{mol}$(Si)+c$_{mol}$(Al)+c$_{mol}$(B)+c$_{mol}$(P)+c$_{mol}$(Ti))) is higher than 3.55 and wherein upon chemical toughening a linear dimension variation in the unit of percentage V$_1$ is so low that an overall geometry variation OGV calculated as (DoL/t)/V$_1$ is higher than 0.8, wherein DoL is a total depth of all ion-exchange layers on one side of the glass and wherein DoL is from >3 μm to <0.5*t, when the glass is chemically toughened with NaNO$_3$ only, KNO$_3$ only, or with both KNO$_3$ and NaNO$_3$, wherein a molar ratio of Li$_2$O/(Li$_2$O+Na$_2$O+K$_2$O) is larger than 0.20.

23. The glass of claim 1, wherein the molar ratio of $Li_2O/(Li_2O+Na_2O+K_2O)$ is larger than 0.21.

* * * * *